(12) United States Patent
Traudt

(10) Patent No.: US 7,213,464 B1
(45) Date of Patent: May 8, 2007

(54) SYSTEM FOR VISUALLY MONITORING PRESSURE IN AN ENCLOSED SPACE

(76) Inventor: Jon E. Traudt, 3316 Augusta Ave., Omaha, NE (US) 68144

( * ) Notice: Subject to any disclaimer, the term of this patent is extended or adjusted under 35 U.S.C. 154(b) by 0 days.

(21) Appl. No.: 11/256,144

(22) Filed: Oct. 21, 2005

Related U.S. Application Data

(60) Provisional application No. 60/621,639, filed on Oct. 25, 2004.

(51) Int. Cl.
*G01L 9/00* (2006.01)
(52) U.S. Cl. ........................................ 73/717
(58) Field of Classification Search ................ 73/717, 73/733, 723, 716, 736, 700
See application file for complete search history.

(56) References Cited

U.S. PATENT DOCUMENTS

| | | | |
|---|---|---|---|
| 2,788,664 A | 4/1957 | Coulbourne et al. | |
| 3,718,047 A | 2/1973 | Nalzagawa | |
| 4,031,847 A | 6/1977 | Sullivan | 116/65 |
| 4,101,747 A | 7/1978 | Houk | 200/83 A |
| 4,176,557 A | 12/1979 | Johnson | 73/708 |
| 4,189,724 A | 2/1980 | Onuma et al. | 340/607 |
| 4,370,890 A | 2/1983 | Frick | 73/718 |
| 4,464,936 A * | 8/1984 | McIntire et al. | 73/705 |
| 5,003,865 A | 4/1991 | Traudt | 454/255 |
| 5,088,329 A | 2/1992 | Sahagen | 73/727 |
| 5,131,887 A | 7/1992 | Traudt | 454/255 |
| 5,271,277 A | 12/1993 | Pandorf | 73/724 |
| 5,481,919 A * | 1/1996 | Brandt, Jr. | 73/723 |
| 5,798,462 A * | 8/1998 | Briefer et al. | 73/722 |
| 6,328,647 B1 | 12/2001 | Traudt | 454/255 |

* cited by examiner

*Primary Examiner*—Andre J. Allen
(74) *Attorney, Agent, or Firm*—James D. Welch

(57) ABSTRACT

A compliant balloon having an outer reflective surface which is positioned next to a transparent window which has an opaque element thereon, the reflection of the opaque element from the outer reflective surface of the balloon being visible when the outer reflective surface is not forced very near or against said opaque element on said transparent window, but prevented when said front reflective surface is forced very near or against the opaque element.

9 Claims, 8 Drawing Sheets

SYSTEM FOR VISUALLY MONITORING PRESSURE IN AN ENCLOSED SPACE

This application Claims Benefit of Provisional Application 60/621,639 Filed Oct. 25, 2004.

TECHNICAL FIELD

The disclosed invention relates to systems for monitoring air pressure in an enclosed space, and more particularly comprises a compliant balloon, (aka bladder, bellows, diaphram etc.), having a reflective front surface which is positioned next to a transparent window which has an opaque element thereon. The reflection of said opaque element from said reflective front surface of said balloon is visible when said reflective front surface is not forced very near or against said transparent window, but said reflection is prevented when said reflective front surface is forced very near or against said transparent window.

BACKGROUND

It is first noted that U.S. Pat. Nos. 5,003,865 and 5,131,887 to Traudt, titled "Pressure Controlled Fresh Air Supply Ventilation System Using Soil Gas Pressure As A Reference, And Method Of Use" describe a particularly relevant, although non-limiting, application for the present invention system. Said 865 and 887 Patents are incorporated by reference herein as they provide insight to the utility provided by the present invention system in a ventilation system for air pressure control in an enclosed space. As general interest, it is noted that the 865 and 887 Patents describe a ventilation system which utilizes soil gas pressure below an enclosed space as a reference pressure, to which enclosed space inside air pressure is compared by the system, during operation. The inlet supply air into the enclosed space is controlled by a device based upon an initial user set value, which set level of supply air, under normal conditions, then adjusted by ventilation system action to counteract changes in a signal derived by comparison of said soil gas pressure and inside enclosed space air pressure, by a differential pressure detecting device. While the 865 and 887 Patents describe utility providing systems, it has become apparent that a more accurate, reliable and economical differential pressure detecting device would optimize their operation.

Additionally, said 865 and 887 Patents further disclose that the quality of air in enclosed spaces such as houses and other buildings is subject in an Environmental Protection Agency Report titled "EPA Report to Congress on Indoor Air Quality", released Aug. 4, 1989. In that report reference is made to the so called "Sick Building Syndrome" and a program of increased research and information dissemination regarding the dangers of poor indoor air quality is recommended. Health effects attributed to air contaminants accumulating in poorly ventilated houses and other buildings range from eye, ear, nose and throat irritation, to full scale respiratory and neurological diseases, genetic mutations and cancer. Contaminants such as radon, asbestos, tobacco smoke, formaldehyde, volatile organic compounds, chlorinated solvents, biological contaminants and pesticides etc., and the synergistic effects of multiple contaminants are cited as causes of health problems. The report suggests that reducing the sources of contaminants is the most direct and dependable option in overcoming the problem, and that while air cleaning equipment can compliment air quality improvement, there is no substitute for providing an adequate supply of fresh air into an enclosed space.

Further, said 865 and 887 Patents disclose that in recent years, the high cost of energy has led many people to strive to make their houses and buildings more tightly sealed, hence, in combination with the use of insulation, more energy efficient. Said efforts have included sealing cracks and other air leaks and/or openings in their houses and/or buildings to prevent heated or cooled air from escaping, and outside air which requires heating or cooling, from randomly entering at an excessive rate. In effect, such houses and buildings become, to various degrees, closed systems. In such structures the fresh air supply rate is often reduced to far below the American Society of Heating, Refrigeration and Air Conditioning. Engineers presently recommended minimum fresh air volume supply rate of 7.5 Cubic Feet per Minute (CFM) per inhabitant, plus 1.0 cubic foot per minute for every square foot of usable floor area, whichever is greater, (see ASHRAE Standard 62.2, 2004, titled "Ventilation and Acceptable Indoor Air Quality in Low-rise Residential Buildings"). The result of an insufficient fresh air supply into, and stale air removal from such tight enclosed spaces is that contaminants accumulate inside same to dangerous health affecting levels. To emphasize this point, it is estimated by some health care researchers that presently more than 20,000 persons per year, in the United States alone, contract lung cancer as a result of contact with radon in poorly ventilated houses and other buildings.

A search of existing Patents during preparation of the 865 and 887 Patents showed that numerous inventors have proposed systems, and methods of their use, which provide controlled ventilation to enclosed spaces such as houses and buildings. The various approaches basically utilize a means to cause air flow, such as a motor driven blower, to force fresh air to move into and stale air to move out of an enclosed space. The fresh air volume supply rate is typically, but not necessarily in the most basic schemes, controlled based upon signals developed by sensing air pressure differences between the inside and the outside of a house or building, from signals derived from sensed rates of air flows in various parts of a system, or by sensing the velocity of the wind outside the house or building.

The most basic schemes simply provide a large fresh air supply into a house or building sufficient to raise the air pressure inside the house or building to a large positive value with respect to that outside the house or building. In such a scheme the fresh air supply must be large enough to maintain the large positive indoor air pressure no matter what active or passive exhaust air flows develop. As an example, operating a clothes dryer or fireplace will actively exhaust air from a house, and opening a door to the outside of the house or building on the downwind side can passively increase exhaust air. One problem with such simple large excessive positive pressure systems is that they are wasteful of energy. The large volume of fresh air which flows into a house or building equipped with such a system must be heated or cooled at times. Another problem with excessively positive indoor air pressure is that humid indoor air will be forced out through openings and pores in the building envelope. During cold weather, moisture condensation within roof and outer-wall cavities enables growth of molds. As a very large fresh air supply rate is not necessary to keep contaminant concentration levels low enough for health maintenance reasons, there is no valid reason to provide it to a tight house or building.

It should now be obvious that ventilation in buildings and houses etc. should be carefully controlled so that an adequate oxygen supply is assured, contaminants in the air are flushed out, and excess air leakage into and out of enclosed spaces is minimized. To do so, however, requires a precise means for monitoring the air pressure difference between the enclosed space and a reference pressure such as outdoor air pressure or soil gas pressure. The present invention differential pressure detecting system precisely monitors the pressure difference between first and second environments.

While the said 865 and 887 Patents provided a ventilation control system which identifies and utilizes a reference pressure, (which is compared to air pressure in an enclosed space controlled environment), so a signal can be derived and variation in the signal can be used to control the fresh air supply rate into, and stale air exhaust rate out of an enclosed space controlled environment, a need remains for a reliable and economical differential pressure detecting system for monitoring very small pressure differentials between first and second environments.

Continuing, U.S. Pat. No. 6,328,647 to Traudt teaches a Pressure Differential Detecting System, and Method of Use comprising a differential pressure detecting system comprised of a first environment accessing substantially compliant first chamber contained within a second environment, or within a second environment accessing substantially rigid second chamber; said differential pressure detecting system being in combination with a sensor means for monitoring change in shape of said substantially compliant first chamber without significantly affecting said shape. In use the internal volume of said substantially compliant first chamber is caused to access a first environment so that pressure differences between said first and second environments can be detected via monitoring of change in shape of the substantially compliant first chamber.

Said 647 Patent thus focuses on monitoring of a change in the shape of a compliant means based on a pressure difference, and is incorporated herein by reference.

Additional Patents of which the inventor is aware are:
U.S. Pat. No. 2,788,664 to Coulbourne et al.;
U.S. Pat. No. 3,718,047 to Nakagawa;
U.S. Pat. No. 4,031,847 to Sullivan;
U.S. Pat. No. 4,101,747 to Hould;
U.S. Pat. No. 4,176,557 to Johnson;
U.S. Pat. No. 4,189,724 to Onuma et al.;
U.S. Pat. No. 4,370,890 to Frick;
U.S. Pat. No. 4,464,936 to McIntire et al.;
U.S. Pat. No. 5,003,865 to Traudt;
U.S. Pat. No. 5,088,329 to Sahagen;
U.S. Pat. No. 5,131,887 to Traudt;
U.S. Pat. No. 5,271,227 to Pandorf;
U.S. Pat. No. 5,481,919 to Brandt Jr.;
U.S. Pat. No. 5,798,462 to Briefer et al.
U.S. Pat. No. 4,176,557 to Johnston
U.S. Pat. Nos. 5,003,865 and 5,131,887 to Traudt, titled "Pressure Controlled Fresh Air Supply Ventilation System Using Soil Gas Pressure As A Reference, And Method Of Use" describe a particularly relevant, although non-limiting, application for the present invention system.

In addition, a Product Information for the Henry G. Dietz Co. Model LPS 100-5, Pressure Transducer is disclosed. Said Pressure Transducer is advertised as capable of detecting an air pressure differential of 0.005 inches of water column by using gold-coated contacts to close an electric circuit.

Finally, it is noted that the U.S. EPA recommends sealing air leaks in the shells of buildings to reduce energy costs, allow for improved environmental control, and minimizing the amount of outdoor air needed to maintain a slight positive indoor pressure. "Measurements in existing schools show that a slight positive air pressure equal to the pressure of as little as 0.001 inches of water column (0.25 Pascals) relative to sub-slab and outdoor air pressure, reduces indoor radon levels by preventing radon entry", (see "Radon Prevention in the Design and Construction of Schools and Other Large Buildings", January 1993, US Environmental Protection Agency, Office of Research and Development, Washington D.C. 20460, EPA/625/R-92/016, P25).

A need remains for an affordable and visually monitorable system which enables easy monitoring of pressure in an enclosed space, and which enables reliable detection of an air pressure differential near 0.001 inches of water column (ie. 0.25 Pascals).

DISCLOSURE OF THE INVENTION

As previously disclosed in U.S. Pat. No. 6,328,647, the present invention system is a differential pressure detecting system. Demonstrative applications of the present invention system include:

Monitoring air pressure in an enclosed space and responding to decreases therein to prevent water vapor from entering walls thereof, leading to general deterioration such as fungus and mold growth therein;

Monitoring air pressure in an enclosed space and responding to decreases therein to minimize entry of water vapor, particulate matter, germs and the like from entering thereinto, such as in hospital room settings;

Monitoring air pressure in an enclosed space above a slab on the ground, and responding to decreases therein to prevent soil gas, (eg. radon), from entering thereinto;

Monitoring air pressure in an enclosed space as compared to outside air pressure prior to lighting a fireplace therein, and making indoor air pressure equal to or greater than outside air pressure so that chimney back-drafting can be avoided;

Monitoring the change in air pressure in a building which results from the opening of a door or window etc. to identify a burglary in progress. This application might involve use of multiple signal developing units in a logic circuit so that false alarms are minimized.

The preferred embodiment of the present invention system is primarily:

a differential pressure detecting system for monitoring very low pressure differentials between first and second environments, and comprises a substantially compliant first chamber contained within a substantially rigid second chamber, with volumes within said substantially compliant first chamber and substantially rigid second chamber accessing, via first and second access means, respectively, said first and second environments, respectively. The operational principal of the present invention system is that when the pressure in the substantially rigid second chamber, (outside the substantially compliant first chamber), is less than that inside said substantially compliant first chamber, said substantially compliant first chamber volume expands. But when the pressure in the substantially rigid second chamber, (outside the substantially compliant first chamber), is equal to or greater than that inside said substantially compliant first chamber, said substantially compliant first chamber volume does not expand, or if previously expanded, decreases. For emphasis, when pressure in the present invention substantially compliant first chamber and the pressure in the substantially rigid second chamber are equal, the volume of the substantially compliant first chamber does not expand, or if previously expanded decreases because of the weight of the material from which the substantially compliant first chamber is constructed. (This is considered an important attribute of the present invention). Said system for detecting pressure difference between first and second environments further comprises a visual and optional electronic detector system means for effectively monitoring change in the volume/shape of said substantially compliant first chamber. Importantly, it is noted that in the preferred embodiment, the application of said visual and optional electronic detector system means have negligible effect on the volume/shape of said substantially compliant first chamber. (This also is considered an important attribute of the present invention).

Preferred present invention system construction provides that said substantially compliant first chamber is made substantially of Mylar, (note, Mylar is a Registered Trademark of Dupont Teijin Films). Operational devices have been made utilizing one-one-thousanth (1/1000) inch thick sheets of Mylar cut into circles of between six (6) and eighteen (18) inches in diameter, which sheets are joined at the circumferential outer edges to form a "balloon"-like structure, however, the outer edge shape of a present invention system can be of any functional shape. Preferred present invention systems provide that a balloon made from two sheets of Mylar, (or functional equivalent), each presenting with an area of between about twenty-eight (28) and one-hundred-fourteen (114) square inches, have said first access means extending into the volume, (formed between said two sheets of Mylar, or functional equivalent, by their being interconnected at circumferential edges), so that the middles of the two layers can separate to a distance of between essentially zero (0.0) and one-and-one-half (1.5) inches. An alternative version of the present invention provides for a single sheet of Mylar, (or functional equivalent), which is attached at its circumference to a rigid base. A folded and/or loosely mounted area of such Mylar, (or functional equivalent), material is beneficial in this embodiment. It is noted that the described operational devices can measure pressure differentials on the order of one-half (0.5) Pascals, (ie. 0.002 inch of water column), because the balloon material is very thin and because detecting expansion or collapse of the balloon system does not affect the "balloon" volume/shape when viewing it or interrogating it to develop a signal. It is noted that the present invention is applicable to monitoring pressures which can be termed "very low" or "extremely low".

Further, a preferred present invention system embodiment provides that the first access means, which extends into the volume within said substantially compliant first chamber, be essentially tubular in shape and have opening(s) present through walls thereof to ensure that air can flow into said substantially compliant first chamber. The reason the hole(s) is/are present through the walls is because, in use, a Mylar sheet, (or functional equivalent), across from the oppositely positioned first essentially tubular access means, can come to rest atop the open end thereof and block small flow of gas into or out thereof. The hole(s) through the wall ensure unobstructed flow of gas no matter the orientation of the present invention system at any given time. (This is yet another attribute of the present invention which is considered very important).

Where a present invention differential pressure monitoring system is utilized to monitor pressure differentials between first and second environments, at least one of which is/are displaced some distance away from the location of the differential pressure monitoring system, at least one of said first and second access means can comprise a length of tubing between said access means and the monitored environment.

The presently disclosed invention provides that the compliant means disclosed in the 647 Patent is preferably a balloon which is free to inflate in response to entry of a gas or liquid thereinto. It is noted that a single sheet diaphragm can also be used which is free to move depending on pressure difference thereacross, but is not preferred.

Said balloon has a front reflective surface which is positioned near a transparent window that has an opaque element thereon, a reflection of said opaque element from said front reflective surface of said balloon being visible when observed from a viewpoint in front of, but centrally offset from, a viewpoint oriented perpendicular to said transparent window at the location of the opaque element. Said reflection of said opaque element is, however, hidden from view or prevented when said reflective surface is very near or in contact with the transparent window.

It is noted that when the balloon is made of, for instance, a metallic material, its movement is accompanied by an audible sound, thereby providing additional signal indicating change in pressure is occurring.

The preferred embodiment of the presently disclosed invention system can be described as a visually, and possibly audibly, monitorable differential pressure detecting system for use in monitoring a pressure differential between first and second environments, said differential pressure detecting system comprising a balloon contained within a substantially rigid framework which has a transparent window on at least one side thereof, which has an opaque element present thereon. The reflection of said opaque element, when monitored from a viewpoint in front of the transparent window which is offset from a viewpoint oriented perpendicular thereto, is viewable when the front reflective surface of the balloon is a distance from the transparent window, but is prevented when said front reflective surface of said balloon is very near, or in contact with the transparent window. In use, when the pressure is greater outside the balloon than it is on the inside thereof, the reflection of said opaque element is viewable, and when the pressure is sufficiently greater on the inside of the balloon than outside thereof, observable reflection of said opaque element is prevented.

A method of detecting a pressure differential between two environments comprising the steps of:

a) providing a visually and possibly audibly monitorable differential pressure detecting system as described above;

b) affixing said visually and possibly audibly monitorable differential pressure detecting system within a substantially enclosed environment;

c) monitoring the reflection of said opaque element from a viewpoint in front of the transparent window but offset from a perpendicular thereto, and noting when said reflection is visible and when it is not.

Said method of detecting a pressure differential between two different environments can further comprise detection of a sound caused by movement of the diaphragm.

A modified disclosed invention system for detecting an air pressure differential between two different environments provides that the system is a visually monitorable differential pressure detecting system for use in monitoring pressure differential between two different environments comprising a balloon having a substantially opaque front surface, but for having a transparent area region therein. Said balloon is again contained within a substantially rigid framework which presents with a transparent window on at least one side thereof which faced said balloon front surface, and there being an opaque element on said transparent window which is positioned to be directly in front of said transparent area of said front surface of said balloon. There is further present a source of electromagnetic radiation positioned in back of said balloon front surface and oriented to direct a beam of electromagnetic radiation through said transparent area, such that when said balloon is not expanded by having a the pressure therewithin to be greater than pressure there-surrounding, electromagnetic radiation passes through said transparent area region of said balloon and past said opaque element on said transparent window which is positioned to be directly in front of said transparent area of said front surface of said balloon, and such that when said balloon is expanded by causing the pressure therewithin to be greater than pressure there-surrounding, electromagnetic radiation can not pass through said transparent area region of said balloon and past said opaque element on said transparent window which is positioned to be directly in front of said transparent area of said front surface of said balloon, because said opaque element covers said transparent area region of said balloon.

A method of using said modified disclosed invention system comprises:

a) providing a system for detecting an air pressure differential between two different environments as just described;

b) causing said visually monitorable differential pressure detecting system to be present within a substantially enclosed environment such that the inside and outside of said balloon are open to two different environments;

c) visually monitoring the presence or absence of electromagnetic radiation passing through said transparent area region of said balloon and past said opaque element on said transparent window which is positioned to be directly in front of said transparent area of said front surface of said balloon.

An alternative embodiment provides a visually monitorable differential pressure detecting system for use in monitoring pressure differential between two different environments. Said differential pressure detecting system comprises a balloon having a front surface, said balloon being contained within a substantially rigid framework which presents with a source of electromagnetic radiation on one side and a window or fiber optic on the other. When said balloon is not inflated electromagnetic radiation, (i.e. light), from said source of electromagnetic radiation reaches said transparent window or fiber optic, and when said balloon is inflated electromagnetic radiation from said source of electromagnetic radiation does not reach said transparent window or fiber optic. An observer detects the state of the Balloon by looking through the transparent window, or at the end of a Fiber Optic.

The present invention pressure differential monitoring sensor can comprise a differential pressure detecting system for monitoring pressure difference between first and second environments comprising a substantially compliant first chamber contained within a substantially rigid second chamber, volumes within said substantially compliant first chamber and substantially rigid second chamber being accessed by first and second access means, respectively, said first and second access means accessing, in use, said first and second environments, respectively.

A method of detecting pressure differential between first and second environments can be recited as comprising the steps of:

a. providing a differential pressure detecting system for monitoring pressure differential between first and second environments as generally described above, wherein said differential pressure detecting system comprises a substantially compliant first chamber contained within a selection from the group consisting of:
 a second environment accessing substantially rigid second chamber; and
 a surrounding second environment;

a volume within said substantially compliant first chamber being accessed by a first access means, said first access means accessing, in use, said first environment;

such that when the pressure in the selection from the group consisting of:
 a second environment accessing substantially rigid second chamber; and
 a surrounding second environment;

is less than that in said substantially compliant first chamber, said substantially compliant first chamber volume expands, and such that when the pressure in the selection from the group consisting of:
 a second environment accessing substantially rigid second chamber; and
 a surrounding second environment;

is equal to or greater than that in said substantially compliant first chamber, said substantially compliant first chamber volume does not expand, or if previously expanded, decreases;

said system for monitoring pressure differential between first and second environments further comprising a system means for effectively monitoring change in the volume/shape of said substantially compliant first chamber without significantly affecting said volume/shape;

b. causing the volume within said substantially compliant first chamber to access, via said first access means, said first environment; and c. monitoring system means for effectively monitoring change in the volume/shape of said substantially compliant first chamber without significantly affecting said volume/shape.

It is further noted that testing of very low pressure monitoring sensor systems available in the marketplace has shown sensitivity to providing false alarms in the presence of vibrations, such as those caused by motors turning on and off, or vehicles passing nearby. Further it has been found that accuracy of the settings in existing very low pressure monitoring sensor systems is prone to decrease with time. Embodiments of the present invention, particularly those which operate by blocking, or un-blocking an electromagnetic beam when a substantially compliant first chamber volume expands, however, have been found to demonstrate substantial immunity to such effects.

The disclosed invention will be better understood by reference to the Detailed Description Section of this Specification, in conjunction with the Drawings.

SUMMARY OF THE INVENTION

It is therefore a primary objective and/or purpose of the present invention to teach a differential pressure detecting system for monitoring pressure difference between first and second environments which comprises a substantially compliant first chamber contained within a selection from the group consisting of:

a second environment accessing substantially rigid second chamber; and a surrounding second environment.

It is another objective and/or purpose of the present invention to teach a differential pressure detecting system for monitoring pressure difference between first and second environments which allows visual and optional audio detection means for effectively monitoring change in the volume/shape of said substantially compliant first chamber without significantly affecting said volume/shape.

It is yet another objective and/or purpose of the present invention to teach a compliant balloon having an outer reflective surface which is positioned next to a transparent window which has an opaque element thereon, the reflection of the opaque element from the outer reflective surface of the balloon being visible when the outer reflective surface is not forced very near or against said opaque element on said transparent window, but prevented when said front reflective surface is forced very near or against the opaque element.

Other objectives and/or purposes of the present invention will become apparent from a reading of the Specification.

DETAILED DESCRIPTION

Figure 1:
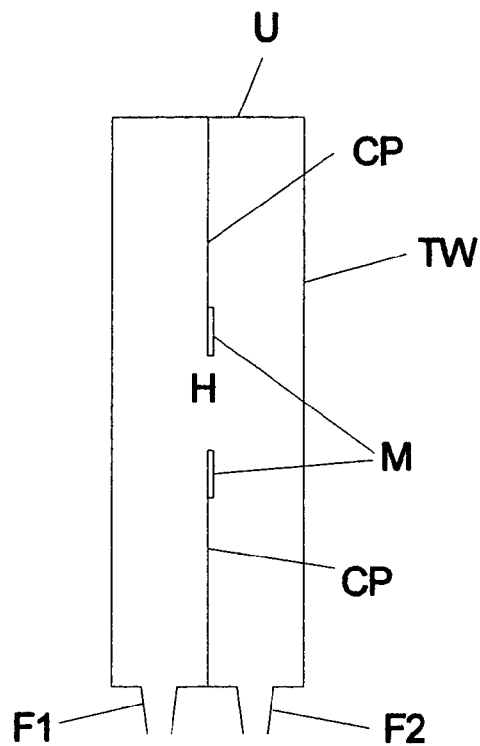
FIG. 1 shows that the disclosed invention comprises an Enclosure (U) with a Transparent Window (TW) at the right side thereof, within which Enclosure is a substantially enclosed space that, as viewed in side elevation, has a Partition (CP) present, which can be centrally located. Note that said Partition (CP) has securing means (eg. Magnetic Material (M)), present surrounding a Hole (H) therethrough.
Figure 3:
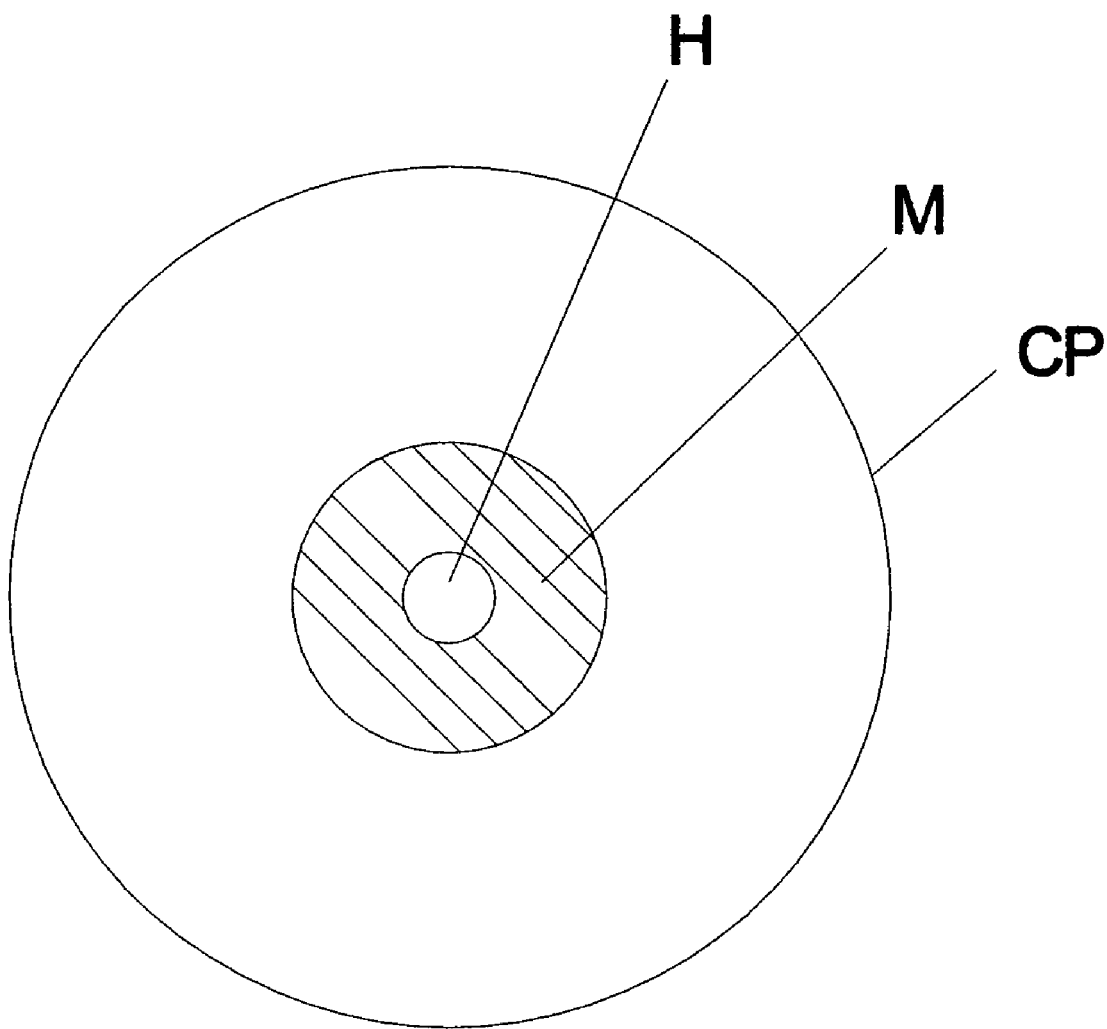
FIG. 3 shows a Front elevational view of the Partition (CP).

Turning now to the Drawings, FIG. 1 shows that the disclosed invention comprises an Enclosure (U) within which is a substantially enclosed space which, as viewed in side elevation has a Partition (CP) present, which can be centrally located. Note that said Partition (CP) has securing means (eg. Magnetic Material (M)), present surrounding a Hole (H) therethrough. FIG. 3 shows a Front elevational view of the Partition (CP). Note also in FIG. 1 that the Right Side of Enclosure (U) is labeled (TW) to indicate a Transparent Window. Said Transparent Window (TW) has an Opaque Element (E) thereon. This will be better appreciated by reference to FIGS. 5a and 5b.

Figure 4A:
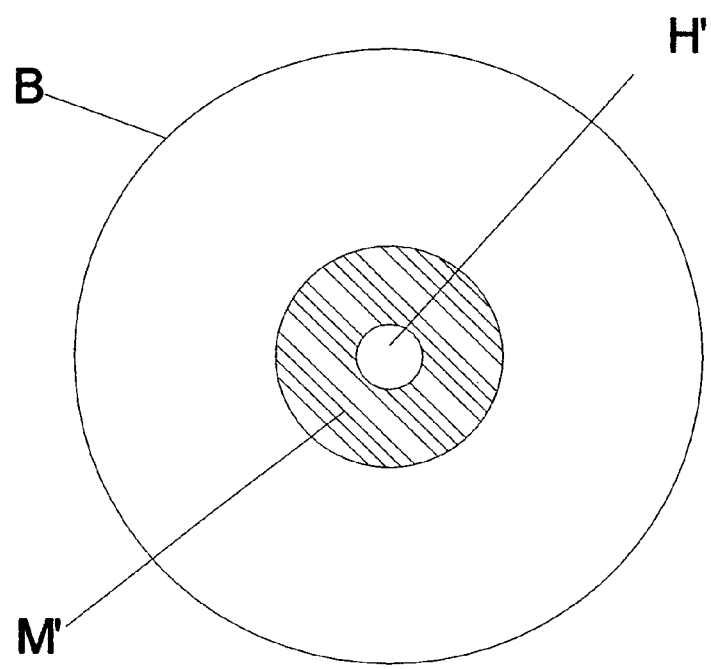
FIGS. 4a and 4b show Rear and Side Elevational views of a Balloon (B) which has access to the inside thereof via Hole (H'), which Hole (H') is surrounded by securing means (eg. Magnetic Material (M'))
Figure 4B:
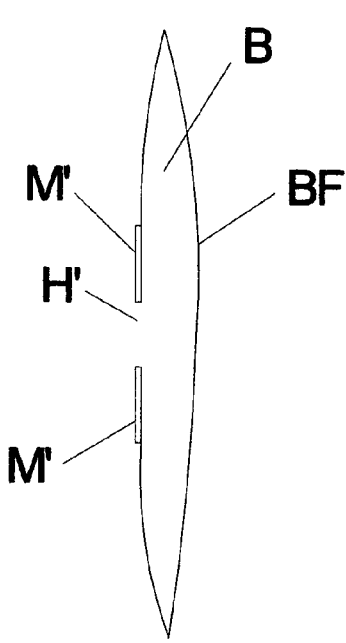

FIGS. 4a and 4b show Rear and Side Elevational views of a Balloon (B) which has access to the inside thereof via Hole (H'), which Hole (H') is surrounded by securing means (eg. Magnetic Material (M'))

Figure 2:
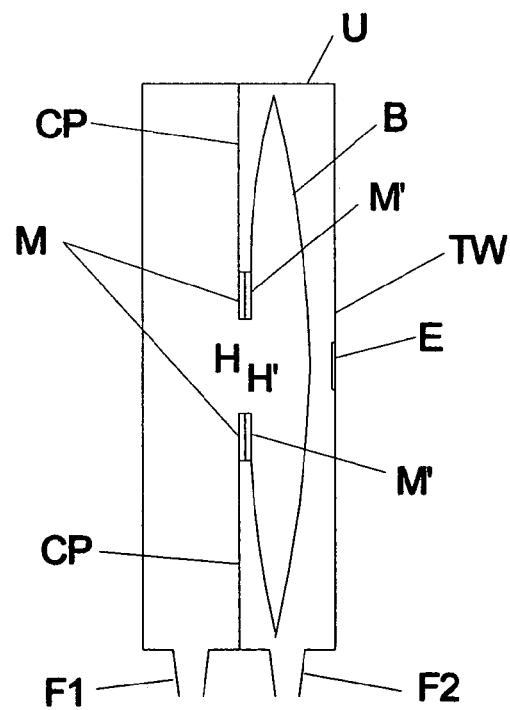
FIG. 2 shows the Enclosure of FIG. 1 with the Balloon (B) of FIGS. 4a and 4b secured in place by securing means (M) and (M'), such that a pathway through Holes (H) and (H') is present.

FIG. 2 shows the Enclosure of FIG. 1 with the Balloon (B) of FIGS. 4a and 4b secured in place by securing means (M) and (M'), such that a pathway through Holes (H) and (H') is present.

Note that FIGS. 2 and 4b indicate the Front (BF) of the Balloon (B). It is disclosed that said Front (BF) is made of a reflective material.

Figure 5A:
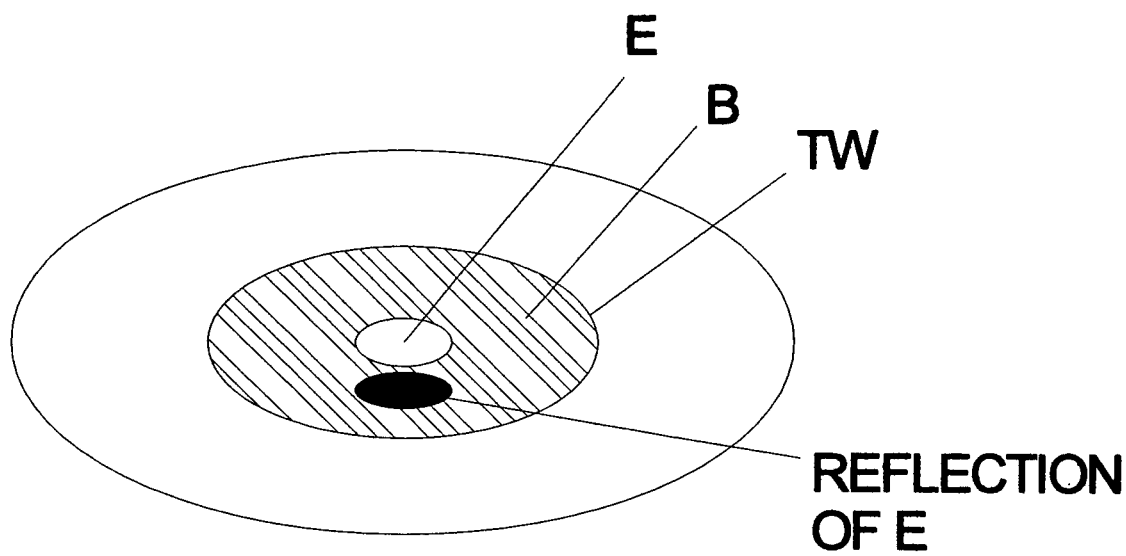
FIGS. 5a and 5b demonstrate contracted and expanded Balloon (B) conditions, respectively, as viewed through the transparent window.
Figure 5B:
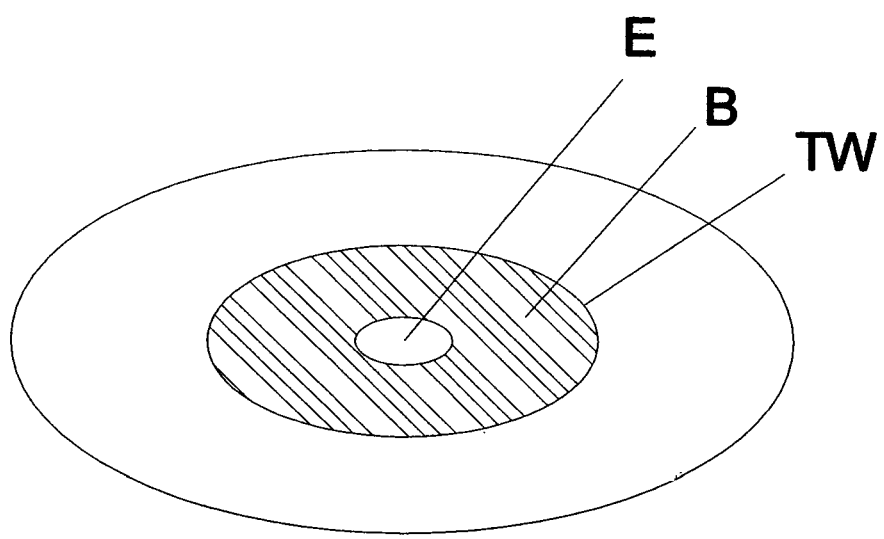

In use the Connectors (F1) and (F2) are attached to means for accessing a First Environment and a Second Environment, such as inside and outside a room. When the Air Pressure in the Volume accessed by Connector (F1) is sufficiently higher than that in the Volume accessed by Connector (F2), the Balloon expands, and when the Air Pressure in the Volume accessed by Connector (F1) is lower than or equal to that in the Volume accessed by Connector (F2), the Balloon contracts. FIGS. 5a and 5b demonstrate a contracted and expanded Balloon (B) condition, respectively. Note that Opaque Element (E) reflects from the Front (BF) of a contracted Balloon (B) such that a reflected Image of Opaque Element (E) is visible when viewed other than straight on. When the Balloon (B) is expanded, as shown in FIG. 5b, the Reflection of the Opaque Element (E) is not seen. Clear visual indication is thus provided, when said Balloon is inflated or deflated.

Figure 6:
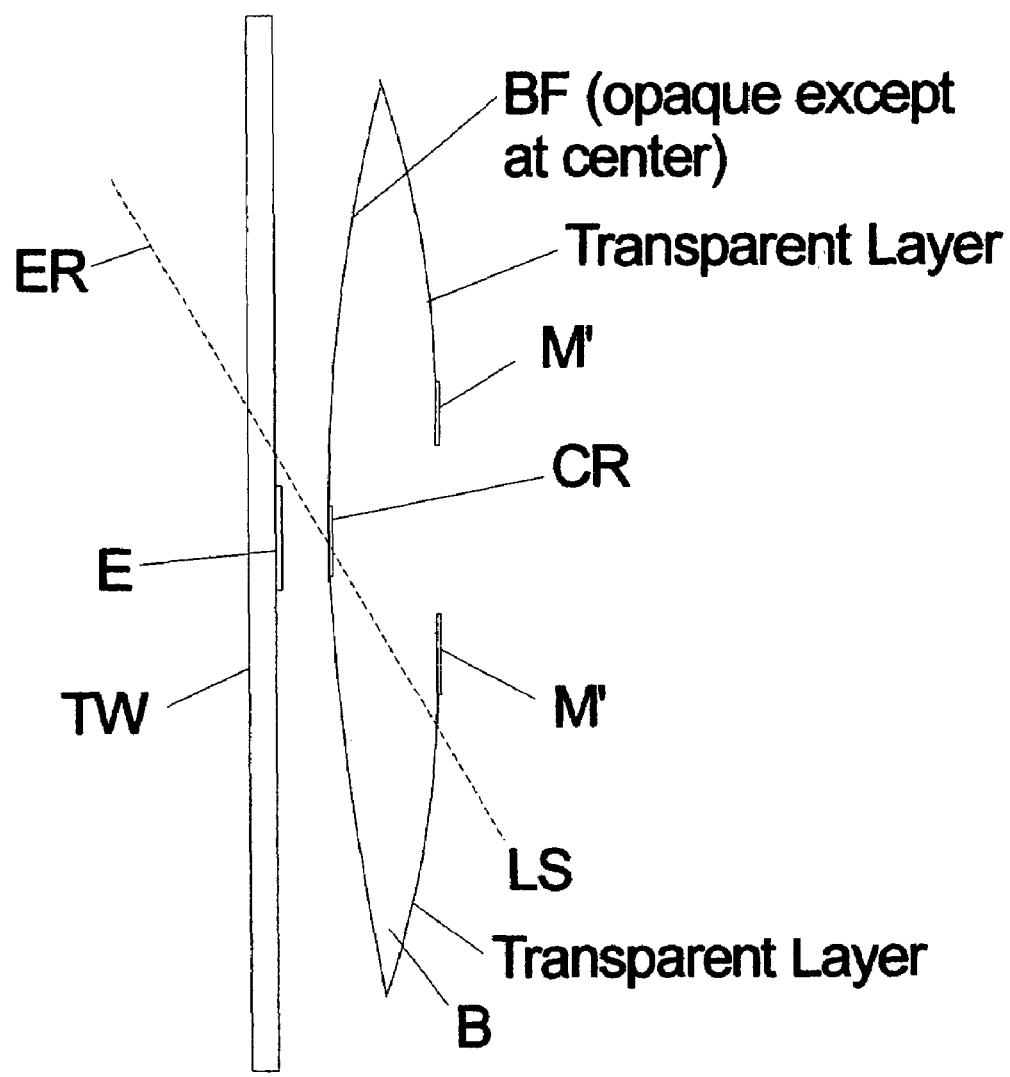
FIG. 6 shows a variation of the Balloon (B). Note the presence of a Central Transparent (Clear) (Region (CR) situated adjacent to the Opaque Element (E).

FIG. 6 shows a variation of the Balloon (B). Note the presence of a Central Transparent (Clear) (Region (CR) situated adjacent to the Opaque Element (E). Also note the presence of a Source of Electromagnetic Radiation (ER) which is oriented to send a Beam of Electromagnetic Radiation through said Clear Region (CR) of the Balloon (B) when said Balloon (B) is not fully expanded. When fully expanded, the Clear Region (CR) of the Balloon (B) is very near or in contact with the Opaque Element (E) and no pathway for the electromagnetic beam exists. The presence, or absence, of the Light Beam (LB) through the Transparent Window (TW) can be seen by an observer and/or sensed by an electrical device and perhaps used as a signal to activate an alarm. (Note that only the Balloon Front (BF) is shown in FIG. 6. The Back of the Balloon can be Clear to allow the Electromagnetic Radiation Beam to pass therethrough).

Figure 7:
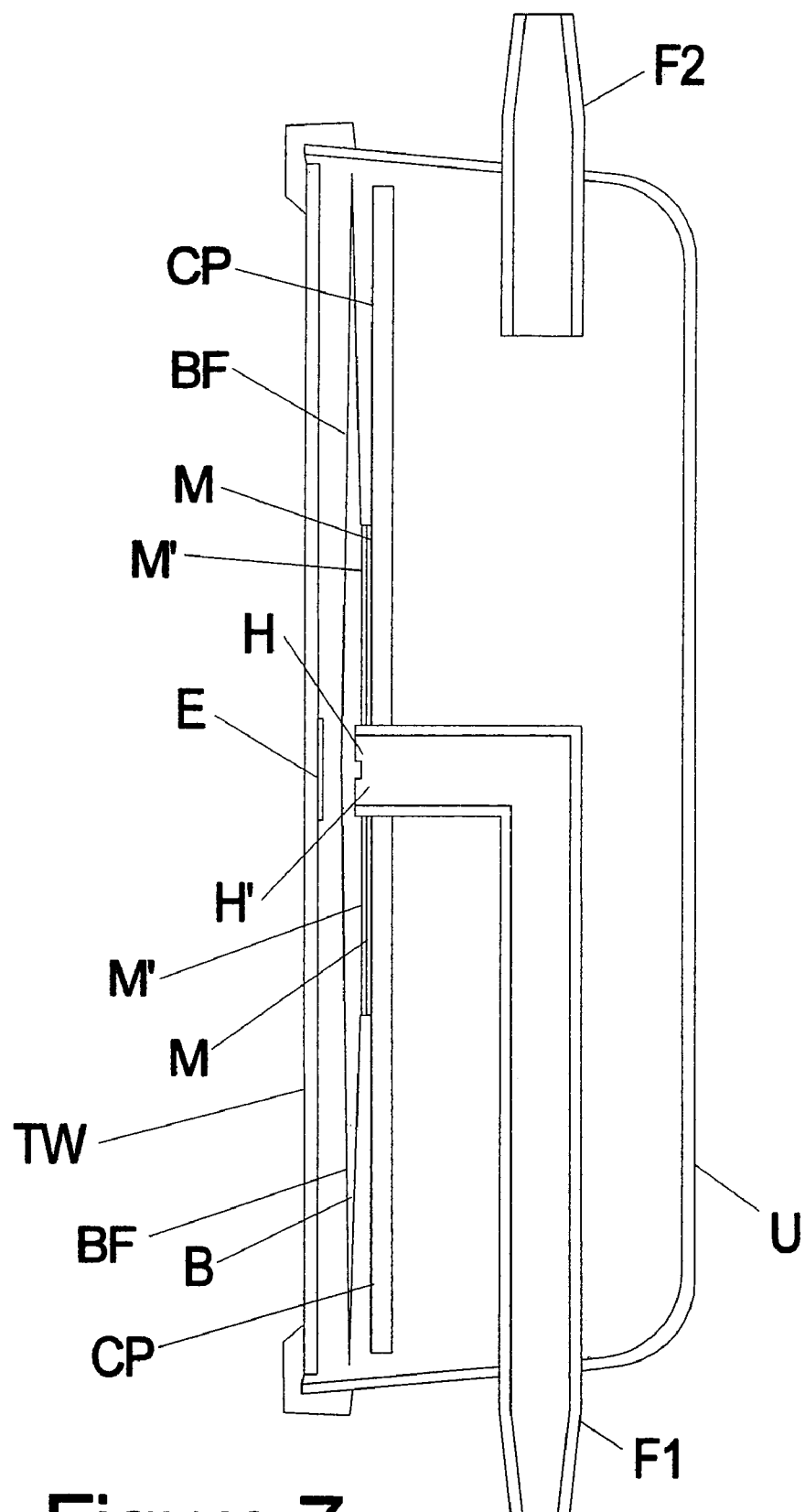
FIGS. 7 and 8 show additional views of the disclosed invention system which are suitable for direct application.
Figure 8:
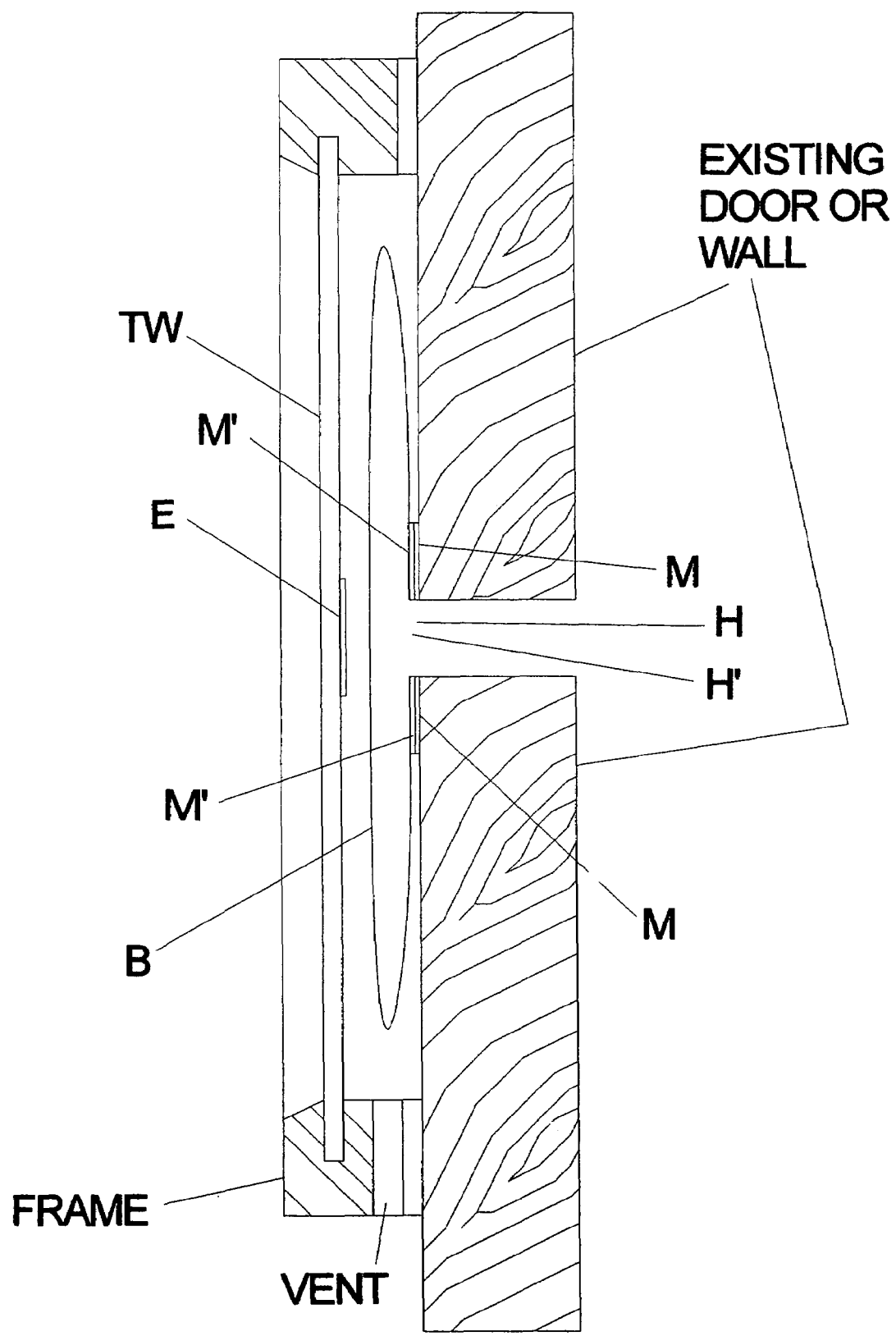

FIGS. 7 and 8 show views of the an disclosed system using the same identifiers as in the other Figures. Said views demonstrate present invention systems suitable for direct application.

Figure 9:
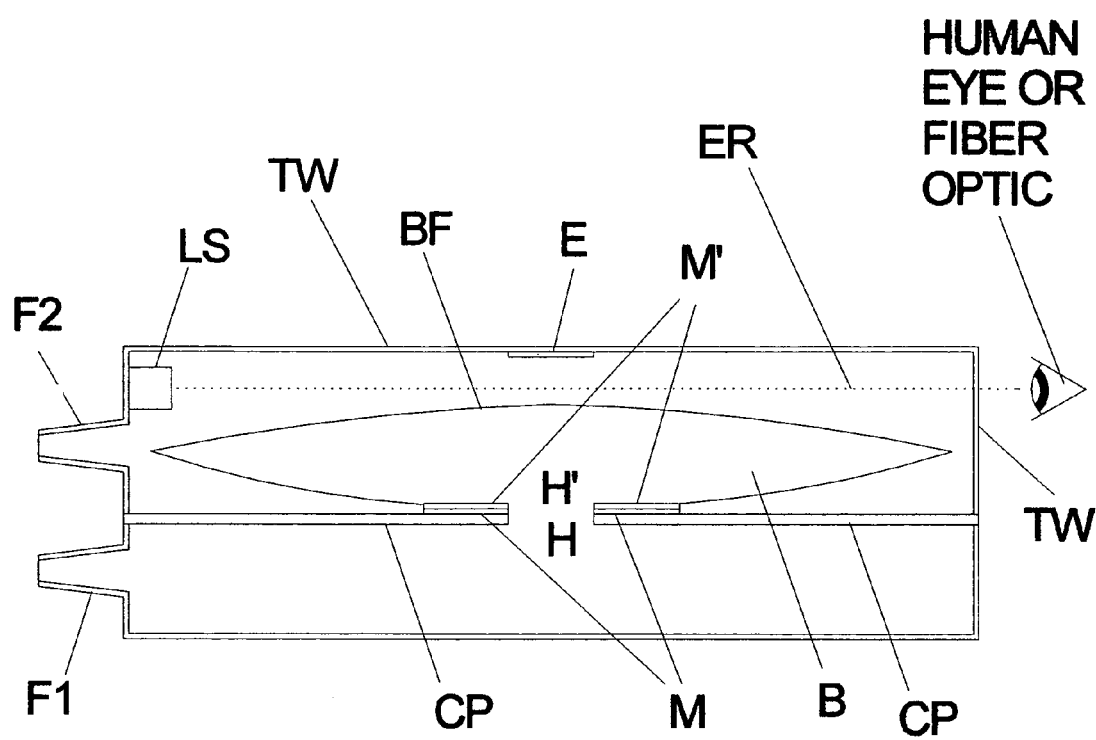
FIG. 9 shows another embodiment and is a modified Drawing from U.S. Pat. No. 6,328,647. A Transparent Window, Lens or Fiber Optic, however, is indicated as located on the side opposite the source of light, (ie. electromagnetic radiation), so that an observer can see if the balloon has expanded enough to block the beam of light.

FIG. 9 shows another embodiment and is a modified Drawing from U.S. Pat. No. 6,328,647. A Transparent window or Fiber Optic, however, is indicated as affixed at the right side. In use an observer will observe if electromagnetic radiation from the LAMP (LS) arrives at said Transparent window or Fiber Optic or is blocked by the Balloon Upper Surface (BF) when said Balloon expands. Note that the end of a Fiber Optic can be located where desired. This embodiment is a departure from the focus in FIGS. 1–8, but is within the consistant theme of providing a visually monitorable indication of pressure difference between two environments.

It is noted that the terminology "volume/shape" is used to indicate that while, in present invention operation, causing a higher pressure to be present inside a substantially compliant first chamber basically leads to its volume expanding, said volume expansion is accompanied by a change in shape of the substantially compliant first chamber. What is actually detected by a present invention detector system, however, is typically more directly related to a change in the shape of the substantially compliant first chamber than it is to the change in its volume.

It is also noted that present invention systems can measure pressure differentials on the order of one-half (0.5) Pascal (ie. 0.002 inch of water column), because the balloon material is very thin and the balloon volume/shape detector system does not affect the "balloon" volume/shape. The terminology "without significantly affecting said volume/shape" as applied to describe the detector system means operation is to be interpreted in light thereof.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

I claim:

1. A visually monitorable differential pressure detecting system for use in monitoring pressure differential between two different environments, said differential pressure detecting system comprising a balloon having a front reflective surface, said balloon being contained within a substantially rigid framework which presents with a transparent window on at least one side thereof, there being an opaque element on said transparent window;

the inside of said balloon being, in use, exposed to one environment and the outside thereof being exposed to another environment;

said front reflective surface being positioned near said opaque element on said transparent window, such that the reflection of said opaque element from said reflective surface of said balloon is viewable when said front reflective surface is a distance from the opaque element, but not visible when said front reflective surface is substantially in contact with or in contact with the opaque element on said transparent window;

such that when the air pressure inside the balloon does not cause the balloon to expand such that the front reflective surface thereof is not substantially in contact with or in contact with the opaque element on the transparent window, the reflection of said opaque element from said reflective surface is viewable, and when the air pressure in said balloon causes the balloon to expand such that the front reflective surface is substantially in contact with or in contact with the opaque element, said reflection of said opaque element is prevented or hidden from view.

2. A visually monitorable differential pressure detecting system as in claim 1, in which the balloon is made of a material which makes an audible sound when expanding or contracting and makes an audible sound when caused to expand or contract.

3. A method of detecting an air pressure differential between two different environments comprising the steps of:

a) providing a differential pressure detecting system comprising a balloon having a front reflective outer surface, said balloon being contained within a substantially rigid framework which presents with a transparent window on at least one side thereof, there being an opaque element on said transparent window;

the inside of said balloon being, in use, exposed to one environment and the outside thereof being exposed to another environment;

said front reflective surface being positioned near said opaque element on said transparent window, such that the reflection of said opaque element from said reflective surface of said balloon is viewable when said front reflective surface is a distance from the opaque element, but not visible when said front reflective surface is substantially in contact with or in contact with the opaque element on the transparent window;

such that when the air pressure inside the balloon does not cause the balloon to expand such that the front reflective surface thereof is not substantially in contact with or in contact with the opaque element on the transparent window, the reflection of said opaque element from said reflective surface is viewable, and when the air pressure in said balloon causes the balloon to expand such that the front reflective surface is substantially in contact with or in contact with the opaque element, said reflection of said opaque element is prevented or hidden from view;

b) causing said differential pressure detecting system to have the inside and outside of said balloon exposed to two different environments;

c) visually monitoring the reflection of said opaque element from said reflective surface from a viewpoint outside of but offset from a perpendicular to the transparent window at the location of said opaque element, and noting when the reflection of the opaque element from said reflective surface is visible, and when it is not visible.

4. A method as in claim 3, which further comprises the detection of a sound caused by movement of the balloon as a signal that change in air pressure is occurring.

5. A visually monitorable differential pressure detecting system for use in monitoring pressure differential between two different environments comprising an enclosure (U) within which is a substantially enclosed space, said enclosure (U), as viewed in side elevation having a partition (CP) present therewithin, said partition (CP) having securing means present surrounding a hole (H) therethrough, said enclosure (U) further having a transparent window (TW) with an opaque element (E) thereon; there being between said transparent window (TW) with an opaque element (E) thereon and said partition (CP), a balloon (B) with a reflective front surface (BF), there being access to the inside thereof via hole (H'), which hole (H') is surrounding by securing means which is complimentary to the securing means on the partition (P), said differential pressure detecting system further comprising means for entering air into and removing air from said balloon (B), via said holes (H) and (H'), and for entering air into and removing air out of the substantially enclosed space within said enclosure (U) which is outside of said balloon (B);

such that in use when more pressure is present in said balloon (B) than is present in said substantially enclosed space within said enclosure (U) which is outside of said balloon (B), a reflection of said opaque element (E) is visible from a viewpoint in front of but offset from a perpendicular to the transparent window (TW) at the location of said opaque element (E), but when the air pressure in said balloon (B) causes the balloon (B) to expand such that the front reflective surface (BF) is substantially in contact with or in contact with the transparent window (TW), said reflection of said opaque element (E) is prevented or hidden from view;

and noting when the reflection of the opaque element (E) from said reflective front (CF) is visible, and when it is not visible.

6. A visually monitorable differential pressure detecting system as in claim 5, in which the balloon is made of a material which makes an audible sound when expanding or contracting and makes an audible sound when caused to expand or contract.

7. A visually monitorable differential pressure detecting system for use in monitoring pressure differential between two different environments, said differential pressure detecting system comprising a balloon having a substantially opaque front surface but for having a transparent area region therein, said balloon being contained within a substantially rigid framework which presents with a transparent window on at least one side thereof which faced said balloon front surface, there being an opaque element on said transparent window which is positioned to be directly in front of said transparent area of said front surface of said balloon;

there further being present a source of electromagnetic radiation positioned in back of said balloon front surface and oriented to direct a beam of electromagnetic radiation through said transparent area;

such that when said balloon is not expanded by causing the pressure therewithin to be greater than pressure there-surrounding, electromagnetic radiation passes through said transparent area region of said balloon and past said opaque element on said transparent window which is positioned to be directly in front of said transparent area of said front surface of said balloon, and such that when said balloon is expanded by causing the pressure therewithin to be greater than pressure there-surrounding, electromagnetic radiation can not pass through said transparent area region of said balloon and past said opaque element on said transparent window which is positioned to be directly in front of said transparent area of said front surface of said balloon, because said opaque element covers said transparent area region of said balloon.

8. A method of detecting an air pressure differential between two different environments comprising the steps of:
a) providing a visually monitorable differential pressure detecting system for use in monitoring pressure differential between two different environments, said differential pressure detecting system comprising a balloon having a substantially opaque front surface but for having a transparent area region therein, said balloon being contained within a substantially rigid framework which presents with a transparent window on at least one side thereof which faced said balloon front surface, there being an opaque element on said transparent window which is positioned to be directly in front of said transparent area of said front surface of said balloon;

there further being present a source of electromagnetic radiation positioned in back of said balloon front surface and oriented to direct a beam of electromagnetic radiation through said transparent area;

such that when said balloon is not expanded by causing the pressure therewithin to be greater than pressure there-surrounding, electromagnetic radiation passes through said transparent area region of said balloon and past said opaque element on said transparent window which is positioned to be directly in front of said transparent area of said front surface of said balloon, and such that when said balloon is expanded by causing the pressure therewithin to be greater than pressure there-surrounding, less electromagnetic radiation can pass through said transparent area region of said balloon and past said opaque element on said transparent window which is positioned to be directly in front of said transparent area of said front surface of said balloon, because said opaque element covers said transparent area region of said balloon;

b) causing said visually monitorable differential pressure detecting system to be present within a substantially enclosed environment such that the inside and outside of said balloon are open to two different environments;

c) from a viewpoint outside of but offset from a perpendicular to the transparent window at the location of said opaque element, visually monitoring the presence of electromagnetic radiation passing through said transparent area region of said balloon and past said opaque element on said transparent window which is positioned to be directly in front of said transparent area of said front surface of said balloon, or its absence.

9. A visually monitorable differential pressure detecting system for use in monitoring a pressure differential between two different environments, said differential pressure detecting system comprising a balloon having a front surface, said balloon being contained within a substantially rigid framework which presents with a source of electromagnetic radiation on one side and a transparent window or fiber optic on the other such that when said balloon is not inflated electromagnetic radiation from the source thereof reaches said transparent window or fiber optic, and when said balloon in inflated electromagnetic radiation from said source thereof does not reach said transparent window, lens or fiber optic.

* * * * *